US012744269B2

(12) United States Patent
Zhou et al.

(10) Patent No.: US 12,744,269 B2
(45) Date of Patent: Sep. 22, 2026

(54) BATTERY CELL AND DEVICE AND METHOD FOR MANUFACTURING THE SAME, BATTERY, AND POWER CONSUMPTION DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Liangfan Xu, Ningde (CN); Quankun Li, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 484 days.

(21) Appl. No.: 18/521,057

(22) Filed: Nov. 28, 2023

(65) Prior Publication Data

US 2024/0097249 A1 Mar. 21, 2024

Related U.S. Application Data

(63) Continuation of application No. PCT/CN2022/070391, filed on Jan. 5, 2022.

(51) Int. Cl.

*H01M 50/171* (2021.01)
*H01M 50/15* (2021.01)
*H01M 50/591* (2021.01)

(52) U.S. Cl.

CPC ......... *H01M 50/171* (2021.01); *H01M 50/15* (2021.01); *H01M 50/591* (2021.01); *H01M 2220/20* (2013.01)

(58) Field of Classification Search

CPC ............ H01M 50/171; H01M 50/591; H01M 50/593; H01M 50/148; H01M 50/242

See application file for complete search history.

(56) References Cited

U.S. PATENT DOCUMENTS

2021/0305645 A1* 9/2021 Li ...................... H01M 50/103

FOREIGN PATENT DOCUMENTS

CN 1838462 A 9/2006
CN 205985096 U 2/2017

(Continued)

OTHER PUBLICATIONS

CN213459894 English translation. Mu et al. China. Jun. 15, 2021. (Year: 2021).*

(Continued)

*Primary Examiner* — Christopher P Domone

(74) *Attorney, Agent, or Firm* — Ladas & Parry LLP

(57) ABSTRACT

Battery cell and a device and a method for manufacturing the same, a battery, and a power consumption device are provided. The battery cell includes: a shell; an end cap patch; an end cap patch; an insulating film, including a main body portion and a flanging portion, wherein the flanging portion is provided between the end cap and the end cap patch; and a first glue layer, comprising a first portion and a second portion which are provided continuously. The first portion is provided around the second portion, and the first portion is provided between the flanging portion and the end cap patch. The first portion bonds the flanging portion and the end cap patch. The second portion is provided between the end cap and the end cap patch, and the second portion bonds the end cap and the end cap patch. The first portion is thinner than the second portion.

15 Claims, 9 Drawing Sheets

(56) References Cited

FOREIGN PATENT DOCUMENTS

| | | | |
|---|---|---|---|
| CN | 207250579 | U | 4/2018 |
| CN | 109904353 | A | 6/2019 |
| CN | 211907597 | U | 11/2020 |
| CN | 213150879 | U | 5/2021 |
| CN | 213278202 | U | 5/2021 |
| CN | 213459894 | U | 6/2021 |
| CN | 113809446 | A | 12/2021 |
| WO | 2016103943 | A1 | 6/2016 |

OTHER PUBLICATIONS

Extended European Search Report for EP application No. 22917755.5, dated Nov. 26, 2024.

International Search Report for International Application No. PCT/CN2022/070391, dated Oct. 10, 2022.

Written Opinion of International Search Authority for International Application No. PCT/CN2022/070391, dated Oct. 10, 2022.

Notification to Grant Patent Right, CN application No. 202220023183.9, dated May 23, 2022.

* cited by examiner

F-F
G
112
111
Z
Y

BATTERY CELL AND DEVICE AND METHOD FOR MANUFACTURING THE SAME, BATTERY, AND POWER CONSUMPTION DEVICE

CROSS REFERENCE TO RELATED APPLICATION

This application is a continuation of International Patent Application No. PCT/CN2022/070391, filed on Jan. 5, 2022, which is incorporated by reference in its entirety.

TECHNICAL FIELD

The present disclosure relates to the technical field of battery manufacturing, and in particular to a battery cell and a device and a method for manufacturing the same, a battery, and a power consumption device.

BACKGROUND

With the continuous prosperity of the market of new energy vehicles, the power battery industry is rapidly expanding and growing, and the lithium battery technology is increasingly refined, which puts forward increasingly higher requirements on the safety performance of the battery.

However, during the use of the battery, due to factors such as aging, jolt and vibration of the battery itself, short circuit may occur inside the battery, which further causes safety accidents.

SUMMARY

In view of this, the present disclosure provides a battery cell and a device and a method for manufacturing the same, a battery, and a power consumption device, which have relatively good safety performance.

In a first aspect, an embodiment of the present disclosure provides a battery cell, including: a shell, having an opening; an end cap, covering the opening; an end cap patch, provided on a side of the end cap facing away from interior of the shell; an insulating film, including a main body portion and a flanging portion, wherein the main body portion is wrapped on an outer surface of the shell, and the flanging portion is provided between the end cap and the end cap patch; and a first glue layer, including a first portion and a second portion which are provided continuously, wherein the first portion is provided around the second portion, the first portion is provided between the flanging portion and the end cap patch, the first portion is configured to bond the flanging portion and the end cap patch, the second portion is provided between the end cap and the end cap patch, and the second portion is configured to bond the end cap and the end cap patch; and in the above, the first portion has a thickness smaller than that of the second portion.

In the battery cell of the embodiments of the present disclosure, the first portion of the first glue layer is provided between the flanging portion and the end cap patch, the second portion is provided between the end cap and the end cap patch, the thickness of the first portion is smaller than that of the second portion, which can be adapted to the fact that a spacing between the flanging portion and the end cap patch is different from a spacing between the end cap and the end cap patch, so that the stress is uniform when the end cap patch is bonded to the flanging portion and the end cap, an edge of the end cap patch is not easy to separate from the end cap, further avoiding warping of the flanging portion from the end cap, ensuring a distance that the flanging portion extends inwards along an edge of the end cap, and ensuring a creepage distance of the battery cell, thus, housings of two adjacent battery cells are effectively insulated and isolated when the two adjacent battery cells are connected in series, and the safety performance of the battery is improved.

In some embodiments of the present disclosure, the first portion has a first surface facing the end cap patch, the second portion has a second surface facing the end cap patch, and the first surface is flush with the second surface.

In the above solution, the first surface is flush with the second surface, so that one side of the first glue layer close to the end cap patch is bonded to the end cap patch without stress, which can avoid the edge of the end cap patch from being separated from the end cap due to non-uniform stress.

According to some embodiments of the present disclosure, a sum of the thickness of the first portion and a thickness of the flanging portion is equal to the thickness of the second portion.

In the above solution, the first portion can fill a gap between the flanging portion and the end cap patch, and the second portion can fill a gap between the end cap and the end cap patch, so that the end cap and the end cap patch are bonded through the first glue layer without stress.

According to some embodiments of the present disclosure, the end cap includes an end cap body and a first convex portion, the end cap body is provided around the first convex portion, the first convex portion protrudes from the end cap body towards a direction facing away from the interior of the shell, the flanging portion, the first portion, and the second portion are all provided between the end cap body and the end cap patch.

In the above solution, the first convex portion protrudes towards a direction facing away from the interior of the shell, then more spaces can be provided on one side of the end cap facing the interior of the battery cell to accommodate components provided on the end cap, so as to reduce the spaces occupied by these components in the shell, thus there are more spaces inside the shell to arrange an electrode assembly, thereby improving energy density of the battery cell, moreover, the flanging portion, the first portion, and the second portion are all provided between the end cap body and the end cap patch, so that not only components provided on the end cap can be avoided, but also construction of the first glue layer can be simplified.

According to some embodiments of the present disclosure, the first glue layer further includes a third portion that is provided continuously with the second portion, and the third portion is provided between the first convex portion and the end cap patch.

In the above solution, the third portion can fill a gap between the first convex portion and the end cap patch, so that an internal stress of the end cap patch is uniform when the end cap patch is bonded to the end cap, thus reducing the possibility of edge warping of the end cap patch.

According to some embodiments of the present disclosure, the first convex portion includes a top wall and a side wall, the side wall surrounds the top wall, the side wall connects the top wall and the end cap body, and the third portion is provided between the side wall and the end cap patch.

In the above solution, the third portion bonds the side wall of the first convex portion and the end cap patch, which not only avoids components provided on the top wall, but also fills a gap between the side wall and the end cap patch, so that the internal stress of the end cap patch is uniform when the end cap patch is bonded to the end cap.

According to some embodiments of the present disclosure, the first convex portion includes a top wall and a side wall, the side wall surrounds the top wall, and the side wall connects the top wall and the end cap body; and the end cap patch includes a patch body and a second glue layer, the second glue layer is located on one side of the patch body facing the end cap, and the second glue layer is configured to bond the top wall and the patch body.

In the above solution, the side of the patch body facing the end cap is provided with the second glue layer, and the second glue layer connects the top wall of the first convex portion with the patch body of the end cap patch, which can further make the end cap patch firmly bonded with the end cap.

According to some embodiments of the present disclosure, the second glue layer covers the side of the patch body facing the end cap, and the second glue layer is at least partially located between the first glue layer and the patch body.

In the above solution, the second glue layer is further configured to bond the first glue layer and the patch body, so that when processing and forming the end cap patch, it can be realized that the second glue layer is first made to fully cover the patch body, and then the end cap patch is punched, thus simplifying a manufacturing process of the end cap patch.

In some embodiments of the present disclosure, the second glue layer includes a fourth portion and a fifth portion, the fourth portion is provided around the fifth portion, the fourth portion is located between the first glue layer and the patch body, and the fifth portion is located between the top wall and the patch body.

In the above solution, the fourth portion of the second glue layer is configured for bonding the first glue layer and the patch body, the fifth portion is configured for bonding the top wall and the patch body, and the fourth portion and the fifth portion jointly fill a gap between the patch body and the end cap, so as to improve stress uniformity when the patch body is bonded to the end cap.

According to some embodiments of the present disclosure, the first glue layer is a thermally conductive glue, the end cap patch is formed thereon with a through hole, the first glue layer further includes a second convex portion, the second convex portion protrudes towards a direction facing away from the end cap, and the second convex portion fills the through hole.

In the above solution, the first glue layer is thermally bonded to the end cap, and a temperature of the second convex portion can represent a temperature of the end cap, so that by connecting the second convex portion to an external temperature sampling component, the temperature of the end cap can be collected, and an operation state of the battery cell is monitored, thus improving the safety performance of the battery cell.

According to some embodiments of the present disclosure, the end cap is rectangular, the flanging portion has overlapping regions at four corners of the end cap, and four corners of the first glue layer are each formed with a notch for avoiding the overlapping region.

In the above solution, a thickness of the overlapping region of the flanging portion is greater than remaining regions, the notch at each of the four corners of the first glue layer can avoid corresponding overlapping region of the flanging portion, and the overlapping region is partially accommodated in corresponding notch, so that the stress is uniform when the end cap patch is bonded to the end cap.

According to some embodiments of the present disclosure, a concave portion is provided on one side of the end cap patch facing the end cap, and the concave portion is provided corresponding to the overlapping region.

In the above solution, the end cap patch has the concave portion corresponding to the overlapping region of the flanging portion, which not only can further avoid the overlapping region of the flanging portion, and make stress uniform when the end cap patch is bonded to the end cap, but also can reduce the spacing between the end cap patch and the end cap, and reduce a degree to which the end cap patch protrudes from the end cap, thus reducing an outer dimension of the battery cell provided with the end cap patch.

In a second aspect, an embodiment of the present disclosure provides a battery, including the battery cell provided in the embodiments in the first aspect of the present disclosure.

Due to characteristics of the battery cell in the embodiments in the first aspect of the present disclosure, the battery in the embodiment in the second aspect of the present disclosure also has relatively good safety performance.

In a third aspect, an embodiment of the present disclosure provides a power consumption device, including the battery provided in the embodiment in the second aspect of the present disclosure, and the battery is used for providing power.

Due to characteristics of the battery cell in the embodiments in the first aspect of the present disclosure, the power consumption device in the embodiment of the third aspect of the present disclosure also has relatively good safety performance.

In a fourth aspect, an embodiment of the present disclosure provides a method for manufacturing a battery cell, including:

providing a shell and an end cap, wherein the shell has an opening;

covering the opening with the end cap;

providing an insulating film;

wrapping an outer surface of the shell with a main body portion of the insulating film, and wrapping a side of the end cap facing away from interior of the shell with a flanging portion of the insulating film;

providing an end cap patch; and bonding the end cap patch to the side of the end cap facing away from the interior of the shell through a first glue layer, wherein the first glue layer includes a first portion and a second portion which are provided continuously, the first portion is provided around the second portion, the first portion is provided between the flanging portion and the end cap patch and bonds the flanging portion and the end cap patch, the second portion is provided between the end cap and the end cap patch and bonds the end cap and the end cap patch, and the first portion has a thickness smaller than that of the second portion.

In a fifth aspect, an embodiment of the present disclosure provides a device for manufacturing a battery cell, including:

a first providing means, configured to provide a shell and an end cap, wherein the shell has an opening;

a second providing means, configured to provide an insulating film;

a third providing means, configured to provide an end cap patch;

a first assembling module, configured to cover the opening with the end cap;

a second assembling module, configured to wrap an outer surface of the shell with a main body portion of the insulating film, and wrap a side of the end cap facing away from interior of the shell with a flanging portion of the insulating film; and a third assembling module, configured to bond the end cap patch to the side of the end cap facing away from the interior of the shell through a first glue layer, wherein the first glue layer includes a first portion and a second portion which are provided continuously, the first portion is provided around the second portion, the first portion is provided between the flanging portion and the end cap patch and bonds the flanging portion and the end cap patch, the second portion is provided between the end cap and the end cap patch and bonds the end cap and the end cap patch, and the first portion has a thickness smaller than that of the second portion.

Additional aspects and advantages of the present disclosure will be partially given in the following description, and partially become apparent from the following description, or be comprehended by practicing the present disclosure.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, therefore, they should not be considered as limitation to the scope, and those ordinarily skilled in the art still could obtain other relevant drawings according to these drawings, without using any creative efforts.

Figure 1:
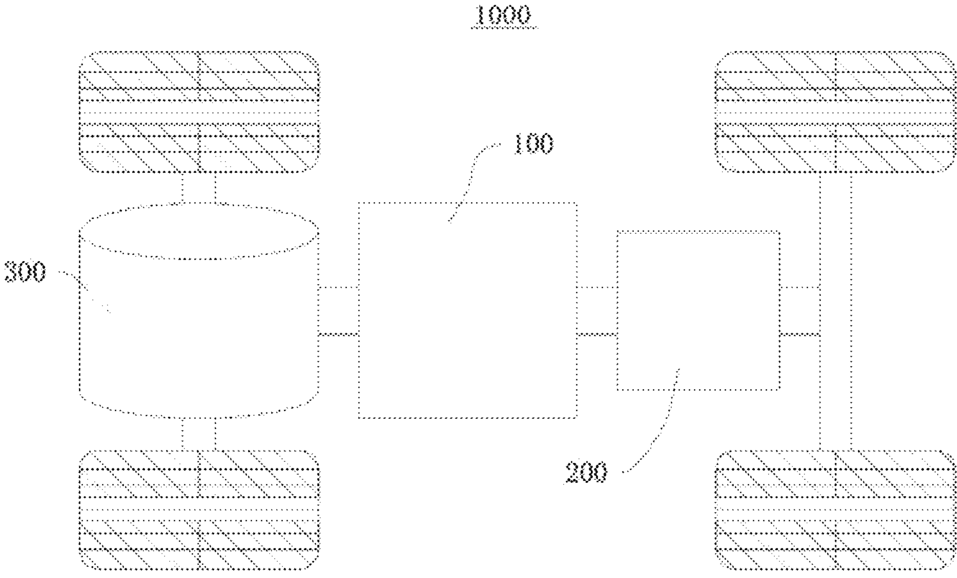
FIG. 1 shows a simplified schematic view of a vehicle in an embodiment of the present disclosure.

The above drawings are not provided to scale.

REFERENCE SIGNS

1000—vehicle;
100—battery;
10—battery cell;
11—housing;
111—shell;
1111—side surface;
1112—bottom surface;
112—end cap;
1121—end cap body;
1122—first convex portion;
11221—side wall;
11222—top wall;
1123—first side;
12—end cap patch;
121—patch body;
122—second glue layer;
1221—fourth portion;
1222—fifth portion;
123—flat portion;
124—groove;
125—through hole;
126—concave portion;
13—insulating film;
131—main body portion;
132—flanging portion;
1321—first flange;
1322—second flange;
1323—third flange;
1324—fourth flange;
1325—overlapping region;
14—electrode terminal;
15—pressure relief member;
16—first glue layer;
161—first portion;
1611—first surface;
1612—third surface;
162—second portion;
1621—second surface;
1622—fourth surface;
163—third portion;
1631—fifth surface;
1632—sixth surface;
164—second convex portion;
165—notch;
20—case;
21—first case;
22—second case;
200—controller;
300—motor;
2000—device for manufacturing a battery cell;
2100—first providing means;
2200—second providing means;
2300—third providing means;
2400—first assembling module;
2500—second assembling module;
2600—third assembling module.

DETAILED DESCRIPTION

In order to make objectives, technical solutions, and advantages of the embodiments of the present disclosure clearer, the technical solutions in the embodiments of the present disclosure will be described clearly below in conjunction with drawings in the embodiments of the present disclosure, and apparently, the embodiments described are some but not all embodiments of the present disclosure. Based on the embodiments in the present disclosure, all of other embodiments, obtained by those ordinarily skilled in the art without any creative efforts, shall fall within the scope of protection of the present disclosure.

Unless otherwise defined, all technical and scientific terms used in the present disclosure have the same meanings as those commonly understood by those skilled in the art to which the present disclosure belongs; the terms used in the description of the present disclosure are merely for the purpose of describing specific embodiments, but are not intended to limit the present disclosure; the terms “comprise (include)” and “have” and any variations thereof in the description and the claims of the present disclosure as well as the above Brief Description of Drawings are intended to be non-exclusive. The terms “first”. “second” and the like in the description and the claims of the present disclosure or the above drawings are used to distinguish different objects, rather than describing a specific order or a primary-secondary relationship.

The phrase “embodiment” mentioned in the present disclosure means that specific features, structures, and characteristics described in combination with the embodiment may be contained in at least one embodiment of the present disclosure. This phrase appearing at various positions in the description does not necessarily refer to the same embodiment, or an independent or alternative embodiment exclusive of another embodiment. Those skilled in the art could explicitly or implicitly understand that an embodiment described in the present disclosure may be combined with other embodiments.

In the description of the present disclosure, it should be noted that unless otherwise explicitly specified and defined, the terms “install (mount)”, “join”, “connect”, and “attach” should be understood in a broad sense, for example, it may be a fixed connection, a detachable connection, or an integrated connection; it may be a direct connection or an indirect connection via an intermediary, or inner communication between two elements. For those ordinarily skilled in the art, specific meanings of the above-mentioned terms in the present disclosure can be understood according to specific circumstances.

The term “a plurality of” appearing in the present disclosure means two or more (including two).

In the present disclosure, the battery cell may include lithium-ion secondary battery, lithium-ion primary battery, lithium-sulfur battery, sodium/lithium ion battery, sodium-ion battery or magnesium-ion battery, etc., which is not limited in the embodiments of the present disclosure. The battery cell may be cylindrical, flat, cuboid or in other shapes, which is not limited in the embodiments of the present disclosure, either. The battery cell may be cylindrical battery cell or prismatic battery cell.

The battery mentioned in the embodiments of the present disclosure refers to a single physical module that includes one or more battery cells so as to provide higher voltage and capacity. For example, the battery mentioned in the present disclosure may include a battery module or a battery pack etc. The battery generally includes a case for encapsulating one or more battery cells, and the case can avoid liquids or other foreign matters from affecting the charging or discharging of the battery cell.

The battery cell includes an electrode assembly and an electrolytic solution, and the electrode assembly is composed of a positive electrode piece, a negative electrode piece, and an isolation film. The operation of the battery cell mainly relies on movement of metal ions between the positive electrode piece and the negative electrode piece. The positive electrode piece includes a positive electrode current collector and a positive active material layer, the positive active material layer is coated on a surface of the positive electrode current collector, the positive electrode current collector not coated with the positive active material layer protrudes from the positive electrode current collector coated with the positive active material layer, and the positive electrode current collector not coated with the positive active material layer is used as a positive electrode tab. Taking a lithium ion battery as an example, a material of the positive electrode current collector may be aluminum, and the positive active material may be lithium cobalt oxide, lithium iron phosphate, ternary lithium or lithium manganate, etc. The negative electrode piece includes a negative electrode current collector and a negative active material layer, the negative active material layer is coated on a surface of the negative electrode current collector, the negative electrode current collector not coated with the negative active material layer protrudes from the negative electrode current collector coated with the negative active material layer, and the negative electrode current collector not coated with the negative active material layer is used as a negative electrode tab. A material of the negative electrode current collector may be copper, and the negative active material may be carbon or silicon, etc. In order to ensure that no fusing occurs when a large current passes, a plurality of positive electrode tabs are provided and stacked together, and a plurality of negative electrode tabs are provided and stacked together. A material of the separator may be PP (polypropylene), PE (polyethylene), or the like. In addition, the electrode assembly may be of a winding structure or a laminated structure, and the embodiments of the present disclosure are not limited thereto.

The battery cell further includes a pressure relief member, which is actuated when an internal pressure of the battery cell reaches a threshold. The threshold is designed different according to different design requirements. The threshold may depend on the material of one or more of the positive electrode piece, the negative electrode piece, the electrolytic solution, and the separator of the battery cell. The pressure relief member may take the form of an explosion-proof valve, an air valve, a pressure relief valve or a safety valve, etc., and may specifically use a pressure-sensitive or temperature-sensitive element or structure, that is, when the internal pressure or temperature of the battery cell reaches the threshold, the pressure relief member performs an action or a weakened structure provided in the pressure relief member is damaged, so as to form an opening or a channel that can be used for relieving the internal pressure or temperature.

The “actuate” mentioned in the present disclosure means that the pressure relief member performs an action or is activated to a certain state, such that the internal pressure and temperature of the battery cell is relieved. The action performed by the pressure relief member may include, but not limited to: rupture, fragmentation, tearing or opening of at least a part of the pressure relief member, and so on. When the pressure relief member is actuated, high-temperature and high-pressure substances inside the battery cell will be discharged out from an open position as emissions. In this way, the pressure and temperature in the battery cell can be relieved at a controllable pressure or temperature, thereby avoiding occurrence of more serious potential accidents.

The battery cell further includes a current collecting member, wherein the current collecting member is configured to electrically connect the tab and an electrode terminal of the battery cell, so as to transport electric energy from the electrode assembly to the electrode terminal, and to the outside of the battery cell via the electrode terminal; a plurality of battery cells realize electrical connection with each other through a bus component, so as to realize series connection, parallel connection or mixed (series and parallel) connection of the plurality of battery cells.

In the related art, in the assembling process of the battery, a higher output voltage can be realized by connecting a plurality of battery cells in series, and two adjacent battery cells are arranged closely against each other, so as to improve the energy density of the battery. However, because a housing of each battery cell has an electric potential corresponding to a negative electrode of the battery cell, if poor insulation performance of the housing of the battery cell causes it to be short-circuited with the housing of another adjacent battery cell, it not only poses potential safety hazards, but also reduces an overall output voltage of the battery.

It is found that, in order to insulate the housing of the battery cell, an insulating film is usually used to wrap a shell of the housing, an edge of the insulating film is bent towards a surface of an end cap to form a flanging portion, then an end cap patch of an insulating material is bonded to the end cap, and the flanging portion of the insulating film is pressed down by an edge of the end cap patch. However, since the flanging portion is provided between the edge of the end cap patch and the end cap, stress of the end cap patch is not uniform, the edge of the end cap patch is easy to warp after long-term use, the flanging portion is caused separated from the end cap, a distance between the edge of the flanging portion and the edge of the end cap becomes smaller, and a creepage distance of the battery cell is insufficient, thus affecting the insulation performance of the housing of the battery cell, and further affecting the safety performance and output voltage of the battery.

On the basis of the above idea, the present disclosure provides a new technical solution, which can avoid the warping of the edge of the end cap patch after long-term use of the battery cell, so that the flanging portion of the insulating film is reliably pressed against the surface of the end cap, and the creepage distance of the battery cell will not be reduced after the battery cell is used for a long time, thus ensuring the insulation performance of the battery cell and the safety performance of the battery.

It can be understood that, the creepage distance of the battery cell refers to a distance that the flanging portion extends inwards from the edge of the end cap along a direction perpendicular to a thickness of the end cap. When the flanging portion is attached to the surface of the end cap, a width of the flanging portion is equal to the creepage distance of the battery cell; and when the flanging portion is separated from the surface of the end cap, the creepage distance of the battery cell is smaller than the width of the flanging portion.

It can be understood that the battery cell described in the embodiments of the present disclosure can directly supply power to a power consumption device, and can also form a battery module or a battery by means of parallel connection or series connection, so as to supply power to various power consumption devices in a form of battery module or battery.

It can be understood that, the power consumption device described in the embodiments of the present disclosure, to which the battery cell, the battery module, or the battery is applicable, may be in a plurality of forms, for example, mobile phones, portable devices, notebook computers, electromobiles, electric automobiles, ships, spacecrafts, electric toys, and electric tools, for example, the spacecrafts include airplanes, rockets, space shuttles, and spaceships, the electric toys include stationary or movable electric toys, for example, game machines, electric automobile toys, electric ship toys, and electric plane toys, the electric tools include metal cutting electric tools, grinding electric tools, assembling electric tools, and railway electric tools such as electric drills, electric grinders, electric spanners, electric screwdrivers, electric hammers, electric impact drills, concrete vibrators, electric planers.

The battery cell, the battery module or the battery described in the embodiments of the present disclosure are not only applicable to the power consumption devices described in the above, but also applicable to all power consumption devices using the battery cell, the battery module, and the battery, while for the sake of brevity of description, the following embodiments take electric vehicles as an example for illustration.

Figure 2:
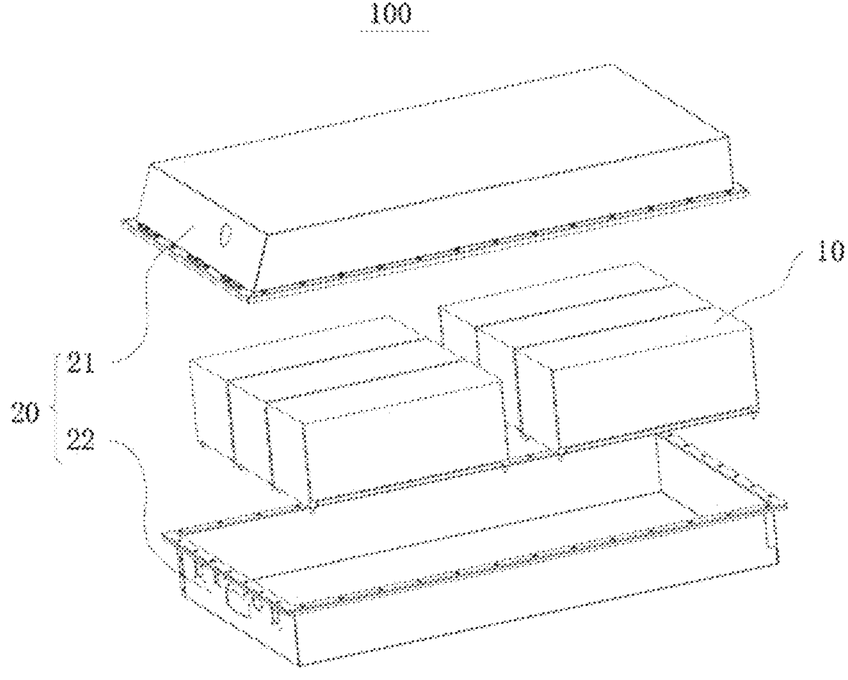
FIG. 2 shows a structural schematic view of a battery of the vehicle in FIG. 1.

FIG. 1 shows a simplified schematic view of a vehicle in an embodiment of the present disclosure, and FIG. 2 shows a structural schematic view of a battery of the vehicle in FIG. 1.

As shown in FIG. 1, a vehicle 1000 is provided therein with a battery 100, a controller 200, and a motor 300, for example, the battery 100 can be provided at a bottom or head or tail of the vehicle 1000. The vehicle 1000 may be a fuel-powered vehicle, a gas-powered vehicle or a new-energy vehicle, and the new-energy vehicle may be a battery electric vehicle, a hybrid vehicle or an extended-range vehicle, or the like.

In some embodiments of the present disclosure, the battery 100 can be used to supply power to the vehicle 1000, for example, the battery 100 can be used as an operation power supply of the vehicle 1000. The controller 200 is configured to control the battery 100 to supply power to the motor 300, for example, for operation power demand of the vehicle 1000 during startup, navigation, and running.

In other embodiments, the battery 100 may be used not only as an operation power supply of the vehicle 1000, but also as a driving power supply of the vehicle 1000, replacing or partially replacing fuel or natural gas to provide a driving power to the vehicle 1000.

In the above, the battery 100 mentioned in the embodiments of the present disclosure refers to a single physical module that includes one or more battery cells 10 to provide higher voltage and capacity. Herein, the plurality of battery cells 10 may be connected in series or in parallel or in a mixed manner to directly form the battery 100, wherein the mixed manner refers to that the connection of the plurality of battery cells 10 includes both series connection and parallel connection. The plurality of battery cells 10 also may be first connected in series, in parallel or in a mixed manner to form a battery module, and then multiple battery modules are connected in series, in parallel or in a mixed manner to form the battery 100.

As shown in FIG. 2, the battery 100 includes a plurality of battery cells 10 and a case 20, and the plurality of battery cells 10 are placed in the case 20. The case 20 includes a first case 21 and a second case 22, wherein the first case 21 and the second case 22 cover each other to form a battery cavity, and a plurality of battery 100 modules are placed in the battery cavity. In the above, the first case 21 and the second case 22 may be shaped according to a combined shape of the plurality of battery modules, and the first case 21 and the second case 22 may each have an opening. For example, the first case 21 and the second case 22 each may be a hollow cuboid and each have only one surface that is an open surface, the opening of the first case 21 is provided opposite to the opening of the second case 22, and the first case 21 and the second case 22 cover each other to form the case 20 with a closed chamber. The plurality of battery cells 10 are combined in parallel connection or series connection or mixed series-parallel connection and are then placed in the case 20 formed by the first case 21 and the second case 22 covered with each other.

Figure 3:
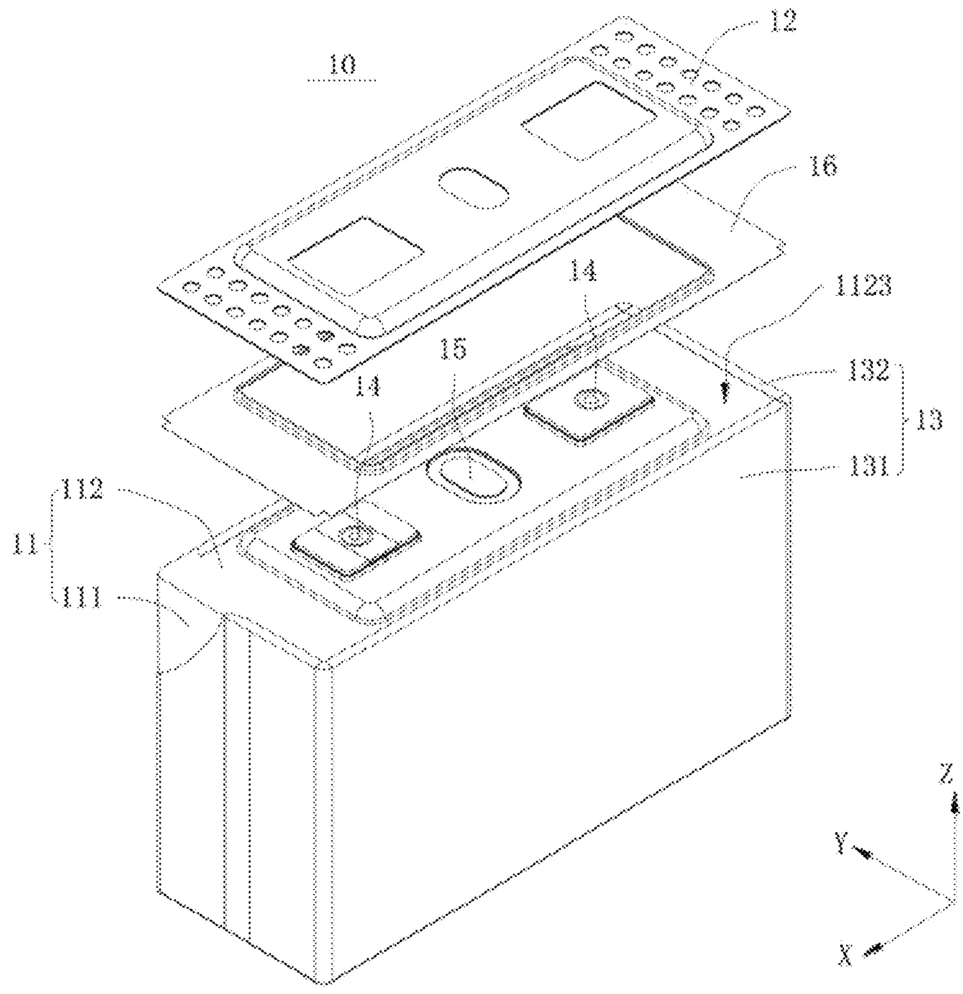
FIG. 3 shows an exploded view of a battery cell in some embodiments of the present disclosure.

FIG. 3 shows an exploded view of the battery cell in some embodiments of the present disclosure.

As shown in FIG. 3, the battery cell 10 includes a housing 11, an end cap patch 12, an insulating film 13, an electrode terminal 14, a pressure relief member 15, an electrode assembly (not shown in the drawing), and a current collecting member (not shown in the drawing).

A shell 111 has an opening, and the shell 111 may be made of a metal material, such as aluminum, aluminum alloy, or nickel-plated steel. The end cap 112 covers the opening so as to seal the electrode assembly inside the housing 11, and the electrode terminal 14 and the pressure relief member 15 are both provided on the end cap 112. The end cap 112 is of a plate-shaped structure, dimension and shape of the end cap 112 are matched with the opening of the shell 111, and the end cap 112 is fixed to the opening of the shell 111, thus sealing the electrode assembly and the electrolytic solution in an accommodating cavity of the shell 111. The end cap 112 is made of a metal material, such as aluminum or steel.

Specifically, the end cap 112 is formed with two electrode lead-out holes, two electrode terminals 14 are provided, the electrode terminals 14 are in one-to-one correspondence with the electrode lead-out holes, and the electrode terminals 14 are installed in the corresponding electrode lead-out holes. The pressure relief member 15 is provided on the end cap 112 and located between the two electrode terminals 14, and the pressure relief member 15 is configured to be actuated when pressure and temperature inside the battery cell 10 reach thresholds, so as to relieve the pressure inside the battery cell 10.

The electrode assemblies are provided inside the shell 111, and each electrode assembly includes a body, a first tab, and a second tab. The body includes a positive electrode piece, a negative electrode piece, and a separator, wherein the separator is located between the positive electrode piece and the negative electrode piece for separating the positive electrode piece from the negative electrode piece. The first tab and the second tab have opposite polarities, the first tab is connected to the electrode terminal 14 with the same polarity via one current collecting member, and the second tab is connected to the electrode terminal 14 with the same polarity via another current collecting member. For the first tab and the second tab, the first tab is a positive electrode tab, the second tab is a negative electrode tab, the current collecting member corresponding to the first tab is made of aluminum, and the current collecting member corresponding to the second tab is made of copper.

The end cap patch 12 is provided on one side of the end cap 112 facing away from the interior of the shell 111, and is configured to insulate and protect the end cap 112. In particular, the end cap patch 12 has a shape matched with that of a side surface of the end cap 112 facing away from the interior of the shell 111. The end cap patch 12 may be a plastic member, and also may be an insulation member made of other materials.

The insulating film 13 includes a main body portion 131 and a flanging portion 132, wherein the main body portion 131 is wrapped on an outer surface of the shell 111, and the flanging portion 132 is provided between the end cap 112 and the end cap patch 12. The main body portion 131 and the flanging portion 132 can be of an integrally formed structure; and the main body portion 131 and the flanging portion 132 also can be separately provided and connected. A material of the insulating film 13 may be PET film, and also may be a film material of other materials with an insulating function.

In some embodiments of the present disclosure, the shell 111 is a hexahedron, and the shell 111 has a lengthwise direction extending along a first direction X, a width direction extending along a second direction Y, and a height direction extending along a third direction Z. The electrode assembly is an elliptical main body or a hexahedron, and a lengthwise direction, a width direction, and a height direction of the electrode assembly are provided corresponding to the shell 111. The end cap 112 is of a rectangular plate-shaped structure, and the end cap 112 has a lengthwise direction extending along the first direction X, a width direction extending along the second direction Y, and a thickness direction extending along the third direction Z. The end cap patch 12 has a lengthwise direction extending along the first direction X, a width direction extending along the second direction Y, and a thickness direction extending along the third direction Z.

In other embodiments, the shell 111 also may be a cylinder or an elliptical cylinder, and the end cap 112 is of a circular or elliptic plate-shaped structure.

Figure 4:
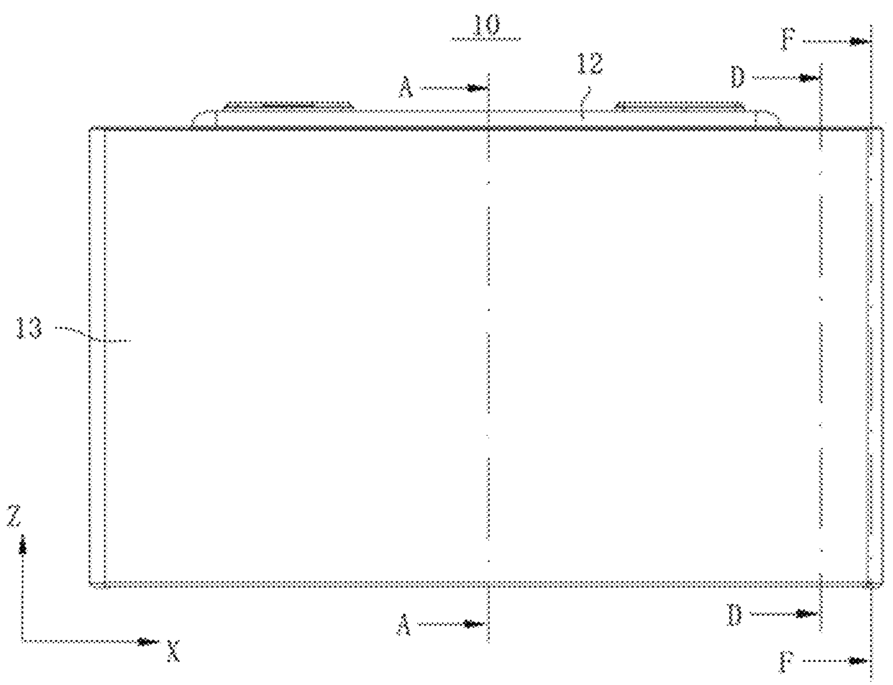
FIG. 4 shows a structural schematic view of the battery cell in some embodiments of the present disclosure (components inside the battery cell are not shown)
Figure 5:
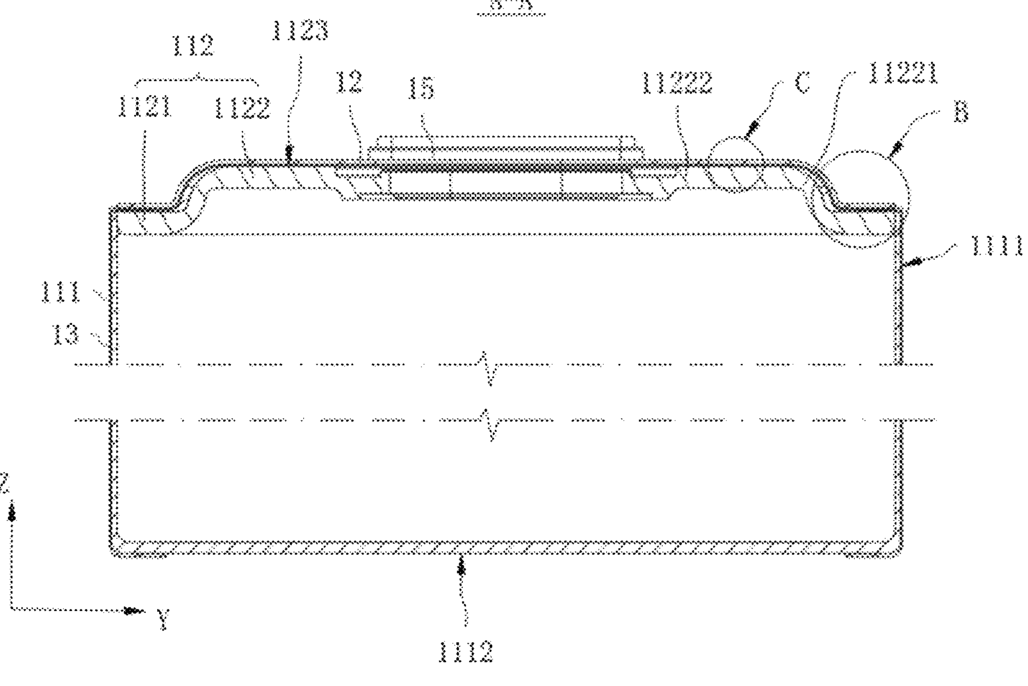
FIG. 5 is an A-A sectional view in FIG. 4.
Figure 6:
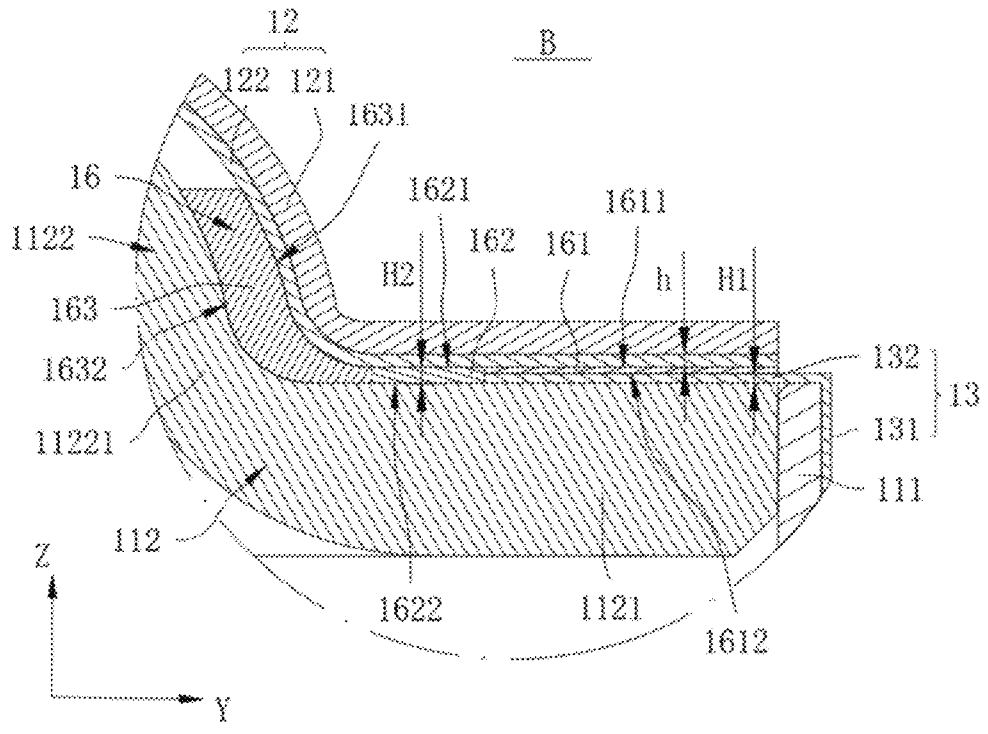
FIG. 6 is a partial enlarged view of part B in FIG. 5.

FIG. 4 shows a structural schematic view of the battery cell in some embodiments of the present disclosure (components inside the battery cell are not shown); FIG. 5 is an A-A sectional view in FIG. 4; and FIG. 6 is a partial enlarged view of part B in FIG. 5.

As shown in FIG. 3, FIG. 4, FIG. 5, and FIG. 6, some embodiments of the present disclosure provide a battery cell 10, including a shell 111, an end cap 112, an end cap patch 12, an insulating film 13, and a first glue layer 16. The shell 111 has an opening, the end cap 112 covers the opening, and the end cap patch 12 is provided on one side of the end cap 112 facing away from interior of the shell 111. The insulating film 13 includes a main body portion 131 and a flanging portion 132, wherein the main body portion 131 is wrapped on an outer surface of the shell 111, and the flanging portion 132 is provided between the end cap 112 and the end cap patch 12. The first glue layer 16 includes a first portion 161 and a second portion 162 which are provided continuously, the first portion 161 is provided around the second portion 162, the first portion 161 is provided between the flanging portion 132 and the end cap patch 12, the first portion 161 is configured to bond the flanging portion 132 and the end cap patch 12, the second portion 162 is provided between the end cap 112 and the end cap patch 12, and the second portion 162 is configured to bond the end cap 112 and the end cap patch 12. In the above, the first portion 161 has a thickness smaller than that of the second portion 162.

It is feasible to provide one insulating film 13, the main body portion 131 of the one insulating film 13 is circumferentially wrapped on the outer surface of the shell 111, and the flanging portion 132 is folded inwards along an edge of the end cap 112 so as to be circumferentially provided between the end cap 112 and the end cap patch 12; it is also feasible to provide a plurality of insulating films 13, the main body portions 131 of the plurality of insulating films 13 are circumferentially wrapped on the outer surface of the shell 111 together; the main body portions 131 of two adjacent insulating films 13 are spliced, the flanging portions 132 of the plurality of insulating films 13 are circumferentially provided at intervals along the edge of the end cap 112, and joints of the flanging portions 132 of two adjacent insulating films 13 are stacked.

As shown in FIG. 5, the outer surface of the shell 111 includes a side surface 1111 and a bottom surface 1112, where the side surface 1111 is provided around the bottom surface 1112. The main body portion 131 of the insulating film 13 can simultaneously wrap the side surface 1111 and the bottom surface 1112 of the shell 111, and one side of the main body portion 131 away from the flanging portion 132 can be folded to the bottom surface 1112 of the shell 111, so as to wrap the bottom surface 1112 of the shell 111; the main body portion 131 of the insulating film 13 also can wrap only the side surface 1111 of the shell 111, and another insulating member is provided to insulate and protect the bottom surface 1112 of the shell 111.

The first glue layer 16 may be a prefabricated component, for example, the first glue layer 16 may be double-sided glue, and attaches the end cap patch 12 with the surface of the end cap 112 in an assembling manner; the first glue layer 16 also may be a component formed after a liquid glue is cured, for example, the liquid glue is applied to the surface of the end cap 112, the end cap patch 12 is placed on the end cap 112 coated with the liquid glue, a position of the end cap patch 12 relative to the end cap 112 is adjusted to be suitable, and after the liquid glue is cured, the end cap patch 12 is bonded to the end cap 112. The first glue layer 16 has a shape matched with that the end cap 112. The first glue layer 16 has a lengthwise direction extending along the first direction X, a width direction extending along the second direction Y, and a thickness direction extending along the third direction Z.

As shown in FIG. 3 and FIG. 5, one side of the end cap 112 facing away from the interior of the shell 111 is a first side 1123, the end cap patch 12 is provided on the first side 1123 of the end cap 112, and the first glue layer 16 is provided between the first side 1123 of the end cap 112 and the end cap patch 12, so as to bond the end cap patch 12 and the end cap 112.

As shown in FIG. 6, the first portion 161 refers to a portion of the first glue layer 16 provided between the flanging portion 132 and the end cap patch 12, and the second portion 162 refers to a portion connected to the first portion 161. In the above, the first portion 161 has a thickness of H1, the second portion 162 has a thickness of H2, H1<H2, the second portion 162 has one end connected to the first portion 161, and the other end extending towards the middle of the first glue layer 16. A step may be formed at a joint of the first portion 161 and the second portion 162 so as to achieve change of the thickness of the first glue layer 16; a transition portion also may be provided at the joint of the first portion 161 and the second portion 162, where the transition portion has one end connected to the first portion 161 and having the thickness of H1, and the other end connected to the second portion 162 and having the thickness of H2.

The end cap patch 12 and the first glue layer 16 are each formed with an opening for exposing the electrode terminal 14 and the pressure relief member 15. In the above, the end cap patch 12 includes three openings, and the three openings are respectively corresponding to two electrode terminals 14 and one pressure relief member 15, so as to reduce an opening area of the end cap patch 12 and improve the insulation and protection effect on the end cap 112. The first glue layer 16 is provided between the end cap 112 and the end cap patch 12, the first glue layer 16 can be provided with one opening to expose the electrode terminal 14 and the pressure relief member 15 at the same time, and can also be provided with an opening corresponding to the opening of the end cap patch 12, so as to better fill a gap between the end cap 112 and the end cap patch 12, and reduce stress non-uniformity of the end cap patch 12.

The end cap 112 is matched with the shape of the end cap patch 12. For example, when the end cap 112 is of a flat structure, the end cap patch 12 is also of a flat structure; when the end cap 112 is of a plate-shaped structure with protrusion or recess on the surface, the end cap patch 12 is also of a plate-shaped structure with protrusion or recess on the surface.

In the battery cell 10 of the embodiments of the present disclosure, since the flanging portion 132 is provided between the end cap 12 and the end cap patch 12, a gap between the flanging portion 132 and the end cap patch 12 is smaller than the gap between the end cap 112 and the end cap patch 12. The first portion 161, with the thickness H1 smaller than the thickness H2 of the second portion 162, can be adapted to different distances between the end cap patch 12 and the end cap 112 and between the end cap patch 12 and the flanging portion 132, so that the stress is uniform when the end cap patch 12 is bonded to the flanging portion 132 and the end cap 112, and the edge of the end cap patch 12 is not easy to separate from the end cap 112, further avoiding warping of the flanging portion 132 from the end cap 112, ensuring the distance that the flanging portion 132 extends inwards along the edge of the end cap 112, and ensuring the creepage distance of the battery cell 10, thus, the housings 11 of two adjacent battery cells 10 are effectively insulated and isolated when the two adjacent battery cells 10 are connected in series, and the safety performance of the battery 100 is improved.

As shown in FIG. 6, in some embodiments of the present disclosure, the first portion 161 has a first surface 1611 facing the end cap patch 12, the second portion 162 has a second surface 1621 facing the end cap patch 12, and the first surface 1611 is flush with the second surface 1621.

The first surface 1611 being flush with the second surface 1621 means that a joint of the first surface 1611 and the second surface 1621 is smooth without a step. Specifically, the first portion 161 further has a third surface 1612 facing the end cap 112, and the second portion 162 further has a fourth surface 1622 facing the end cap 112. The first surface 1611 is flush with the second surface 1621, the fourth surface 1622 protrudes from the third surface 1612, and a step is formed between the third surface 1612 and the fourth surface 1622, so that it is realized that the thickness H1 of the first portion 161 is smaller than the thickness H2 of the second portion 162.

In the above solution, the first surface 1611 and the second surface 1621 are flush so as to be bonded together with the surface of the end cap patch 12 facing the end cap 112, thus reducing the stress non-uniformity of the end cap patch 12, and being capable of avoiding separation of the edge of the end cap patch 12 from the end cap 112 due to the stress non-uniformity.

In some embodiments of the present disclosure, a sum of the thickness H1 of the first portion 161 and the thickness h of the flanging portion 132 is equal to the thickness H2 of the second portion 162.

As shown in FIG. 6, specifically, the flanging portion 132 has one side attached to the end cap 112, and the other side attached to the first portion 161. A sum of the thickness H1 of the first portion 161 and the thickness h of the flanging portion 132 is equal to the thickness H2 of the second portion 162, i.e., H2=H1+h.

In the above solution, the first portion 161 can fill the gap between the flanging portion 132 and the end cap patch 12, and the second portion 162 can fill the gap between the end cap 112 and the end cap patch 12, so that the end cap 112 and the end cap patch 12 are bonded through the first glue layer 16 without stress.

As shown in FIG. 5 and FIG. 6, in some embodiments of the present disclosure, the end cap 112 includes an end cap body 1121 and a first convex portion 1122, the end cap body 1121 is provided around the first convex portion 1122, the first convex portion 1122 protrudes from the end cap body 1121 towards a direction facing away from the interior of the shell 111, the flanging portion 132, the first portion 161, and the second portion 162 are all provided between the end cap body 1121 and the end cap patch 12.

Figure 7:
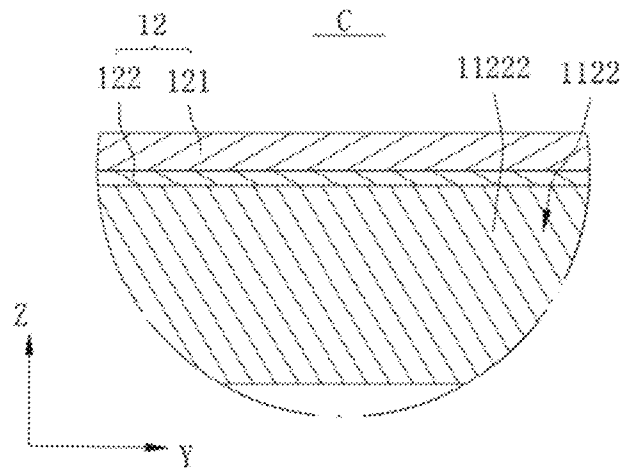
FIG. 7 shows a partial enlarged view of part C in FIG. 5.
Figures 8, 9:
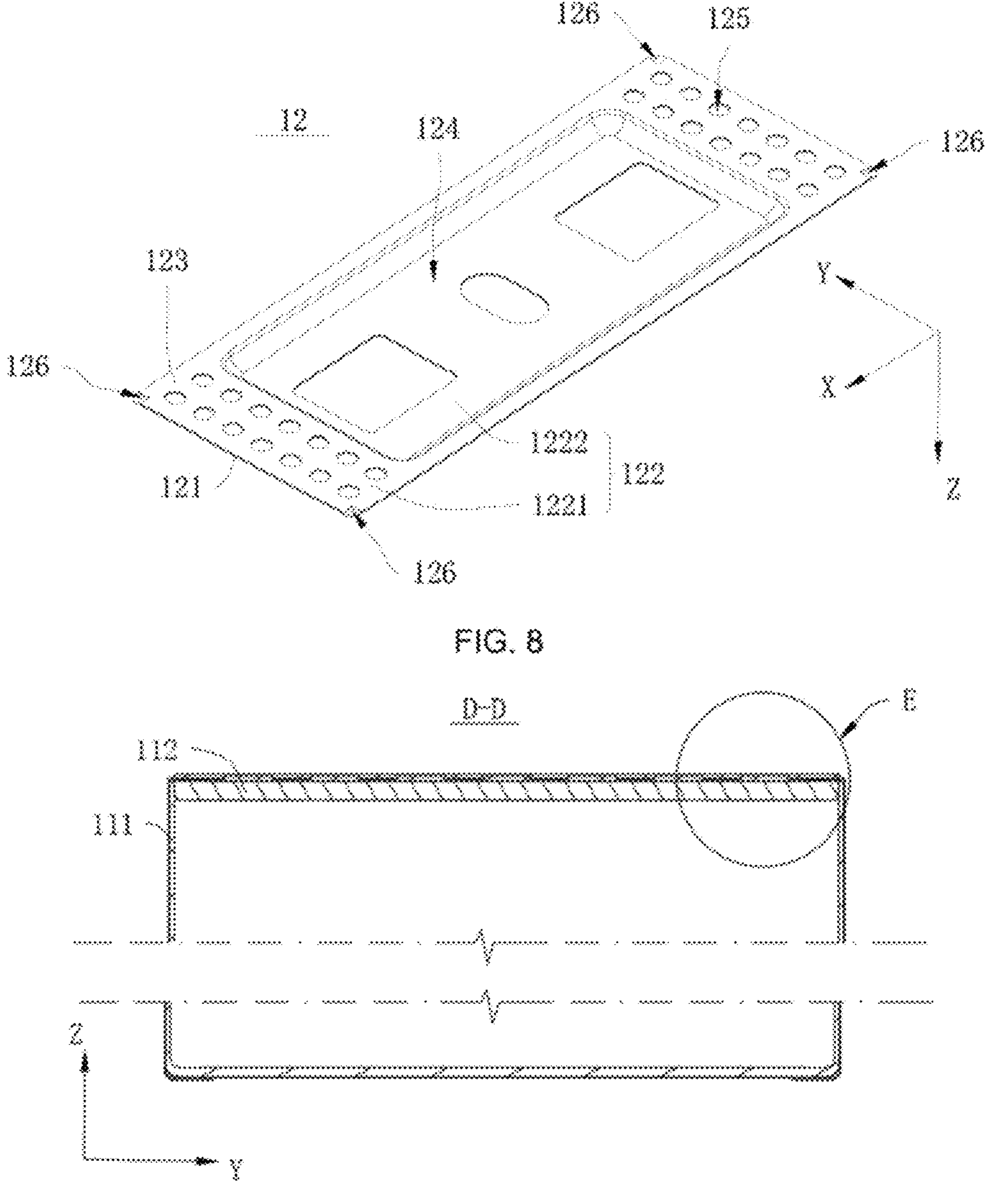
FIG. 8 shows a structural schematic view of an end cap patch of the battery cell in some embodiments of the present disclosure.
FIG. 9 shows a D-D sectional view in FIG. 4.

FIG. 7 shows a partial enlarged view of part C in FIG. 5; and FIG. 8 shows a structural schematic view of the end cap patch of the battery cell in some embodiments of the present disclosure.

As shown in FIG. 6, FIG. 7, and FIG. 8, the end cap patch 12 includes a flat portion 123 and a groove 124, wherein the groove 124 is recessed towards a direction facing away from the end cap 112, the flat portion 123 is provided corresponding to the end cap body 1121 of the end cap 112, the groove 124 is formed corresponding to the first convex portion 1122 of the end cap 112, and the first convex portion 1122 is accommodated in the groove 124.

The first convex portion 1122 is provided with the electrode terminal 14 and the pressure relief member 15 (as shown in FIG. 3), and the end cap body 1121 is configured to be connected to the shell 111 and attached to the flanging portion 132.

In the above solution, the first convex portion 1122 protrudes towards a direction facing away from the interior of the shell 111, and more spaces can be provided on one side of the end cap 112 facing the interior of the battery cell 10 to accommodate components provided on the end cap 112, so that there are more spaces inside the shell 111 to arrange the electrode assembly, thus improving energy density of the battery cell 10; moreover, the flanging portion 132, the first portion 161, and the second portion 162 are all provided between the end cap body 1121 and the end cap patch 12, so that not only components provided on the end cap 112 can be avoided, but also the construction of the first glue layer 16 can be simplified.

As shown in FIG. 6, in some embodiments of the present disclosure, the first glue layer 16 further includes a third portion 163 that is provided continuously with the second portion 162, and the third portion 163 is provided between the first convex portion 1122 and the end cap patch 12.

As shown in FIG. 6, the third portion 163 includes a fifth surface 1631 on a side facing the end cap patch 12, and includes a sixth surface 1632 on a side facing the first convex portion 1122, and the sixth surface 1632 is bonded to the first convex portion 1122. The third portion 163 of the first glue layer 16 has a thickness corresponding to a gap between the first convex portion 1122 and the end cap patch 12, the fifth surface 1631 of the third portion 163 has a shape corresponding to that of the groove 124 of the end cap patch 12, and the sixth surface 1632 has a shape corresponding to that of the first convex portion 1122.

One end of the third portion 163 is connected to the second portion 162, and the other end may completely cover the first convex portion 1122 and is provided with an opening corresponding to the end cap patch 12, for components such as the electrode terminal 14 and the pressure relief member 15 to be exposed outside the end cap patch 12; the other end of the third portion 163 also may be enclosed to form an opening, for components such as the electrode terminal 14 and the pressure relief member 15 to be exposed outside the end cap patch 12.

In the above solution, the third portion 163 can fill the gap between the first convex portion 1122 and the end cap patch 12, so that the internal stress of the end cap patch 12 is uniform when the end cap patch 12 is bonded to the end cap 112, thus reducing the possibility of edge warping of the end cap patch 12.

As shown in FIG. 5 and FIG. 6, in some embodiments of the present disclosure, the first convex portion 1122 includes a top wall 11222 and a side wall 11221, the side wall 11221 surrounds the top wall 11222, the side wall 11221 connects the top wall 11222 and the end cap body 1121, and the third portion 163 is provided between the side wall 11221 and the end cap patch 12.

Components such as the pressure relief member 15 and the electrode terminal 14 are provided on the first convex portion 1122, and the third portion 163 of the first glue layer 16 fills a gap between the side wall 11221 and the groove 124 of the end cap patch 12.

The top wall 11222 and the end cap body 1121 may be provided in parallel, and the top wall 11222 and the end cap body 1121 also may be provided in an inclined manner; and the top wall 11222 and the side wall 11221 may be provided perpendicular to each other, and the top wall 11222 and the side wall 11221 also may be provided at an obtuse angle.

In the above solution, the third portion 163 bonds the side wall 1121 of the first convex portion 1122 and the end cap patch 12, which not only avoids components provided on the top wall 11222, but also fills the gap between the side wall 1121 and the end cap patch 12, so that the internal stress of the end cap patch 12 is uniform when the end cap patch 12 is bonded to the end cap 112.

As shown in FIG. 6 and FIG. 7, in some embodiments of the present disclosure, the first convex portion 1122 includes a top wall 11222 and a side wall 11221, the side wall 11221 surrounds the top wall 11222, and the side wall 11221 connects the top wall 11222 and the end cap body 1121. The end cap patch 12 includes a patch body 121 and a second glue layer 122, wherein the second glue layer 122 is located on one side of the patch body 121 facing the end cap 112, and the second glue layer 122 is configured to bond the top wall 11222 and the patch body 121.

A material of the second glue layer 122 may be a double-sided glue. The second glue layer 122 may only bond the top wall 11222 to the patch body 121, and also may bond the side wall 11221 to the patch body 121 while bonding the top wall 11222 to the patch body 121; the second glue layer 122 may only bond the first convex portion 1122 to the patch body 121, and also may further bond the first glue layer 16 to the patch body 121 while bonding the first convex portion 1122 to the patch body 121.

The patch body 121 is formed thereon with openings corresponding to the electrode terminal 14 and the pressure relief member 15 (as shown in FIG. 3), and the second glue layer 122 is formed thereon with openings corresponding to via holes of the patch body 121.

In the above solution, one side of the patch body 121 facing the end cap 112 is provided with a second glue layer 122, and the second glue layer 122 connects the top wall 11222 of the first convex portion 1122 with the patch body 121 of the end cap patch 12, which can further firmly bond the end cap patch 12 to the end cap 112.

In some embodiments of the present disclosure, the second glue layer 122 covers the side of the patch body 121 facing the end cap 112, and the second glue layer 122 is at least partially located between the first glue layer 16 and the patch body 121.

The second glue layer 122 covering the side of the patch body 121 facing the end cap 112 refers to that an edge of the second glue layer 122 is aligned with an edge of the patch body 121, an opening of the second glue layer 122 is provided corresponding to the opening of the patch body 121, and on an XY plane, the second glue layer 122 and the patch body 121 have the same projection profiles.

The second glue layer 122 can be completely provided between the first glue layer 16 and the patch body 121, and it is also feasible that one part is provided between the first glue layer 16 and the patch body 121, and the other part is provided between the first convex portion 1122 and the patch body 121.

In the above solution, the second glue layer 122 is also configured for bonding the first glue layer 16 and the patch body 121, so that it can be realized that when processing and forming the end cap patch 12, the second glue layer 122 is first made to fully cover the patch body 121, and then the end cap patch 12 is punched, thus simplifying a manufacturing process of the end cap patch 12.

As shown in FIG. 6, FIG. 7, and FIG. 8, in some embodiments of the present disclosure, the second glue layer 122 includes a fourth portion 1221 and a fifth portion 1222, the fourth portion 1221 is provided around the fifth portion 1222, the fourth portion 1221 is located between the first glue layer 16 and the patch body 121, and the fifth portion 1222 is located between the top wall 11222 and the patch body 121.

The fifth portion 1222 is recessed towards a direction facing away from the end cap 112, so that the second glue layer 122 is matched with the shape of the patch body 121.

The fourth portion 1221 and the fifth portion 1222 may have the same thickness, and the fourth portion 1221 and the fifth portion 1222 are of an integrally formed structure; and it is also feasible that the thicknesses of the fourth portion 1221 and the fifth portion 1222 are not limited, and the fourth portion 1221 and the fifth portion 1222 may be separately provided.

In the above solution, the fourth portion 1221 of the second glue layer 1221 is configured for bonding the first glue layer 16 and the patch body 121, the fifth portion 1222 is configured for bonding the top wall 11222 and the patch body 121, and the fourth portion 1221 and the fifth portion 1222 jointly fill the gap between the patch body 121 and the end cap 112, so as to improve stress uniformity when the patch body 121 is bonded to the end cap 112.

Figures 10, 11:
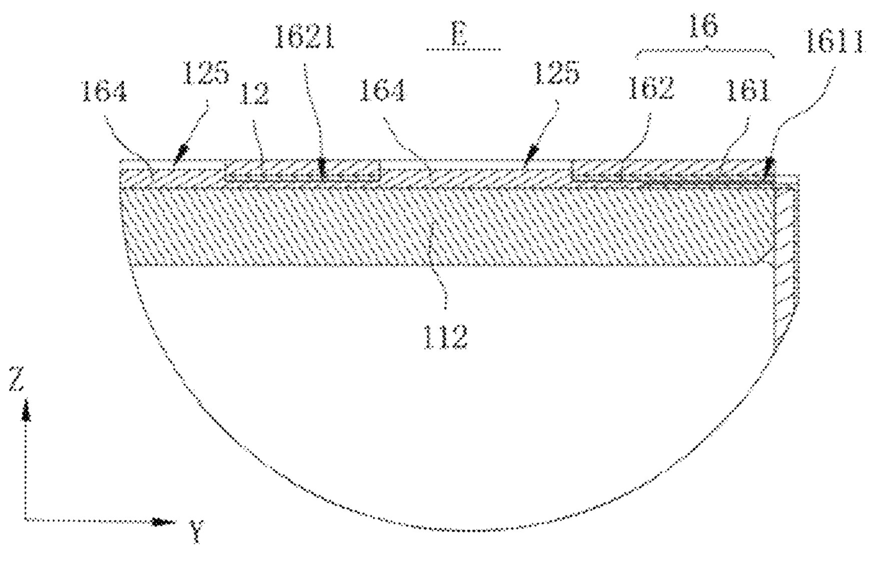
FIG. 10 shows a partial enlarged view of part E in FIG. 9.
FIG. 11 shows an F-F sectional view in FIG. 4.

FIG. 9 shows a D-D sectional view in FIG. 4; and FIG. 10 shows a partial enlarged view of part E in FIG. 9.

As shown in FIG. 8, FIG. 9, and FIG. 10, in some embodiments of the present disclosure, the first glue layer 16 is a thermally conductive glue, the end cap patch 12 is formed thereon with a through hole 125, the first glue layer 16 further includes a second convex portion 164, the second convex portion 164 protrudes towards a direction facing away from the end cap 112, and the second convex portion 164 fills the through hole 125.

Specifically, the second convex portion 164 can be formed on the first surface 1611 of the first portion 161, or on the second surface 1621 of the second portion 162, or at a joint of the first surface 1611 and the second surface 1621.

The number of through holes 125 of the end cap patch 12 may be one, and the one through hole 125 is formed on the flat portion 123 of the end cap patch 12; the end cap patch 12 also may be formed with two sets of through holes 125, the two sets of through holes 125 are formed opposite to each other on the flat portion 123 along the first direction X, and are respectively located on two sides of the groove 124, and each set of through holes 125 includes at least one through hole 125.

An end portion of the second convex portion 164 may be flush with a surface of one side of the end cap patch 12 facing away from the end cap 112, or may protrude from or recess into the surface of the side of the end cap patch 12 facing away from the end cap 112.

In the above solution, the first glue layer 16 is thermally attached to the end cap 112, and a temperature of the second convex portion 164 can represent a temperature of the end cap 112, so that by connecting the second convex portion 164 to an external temperature sampling component, the temperature of the end cap 112 can be collected, and an operation state of the battery cell 10 is monitored, thus improving the safety performance of the battery cell 10.

Figure 12:
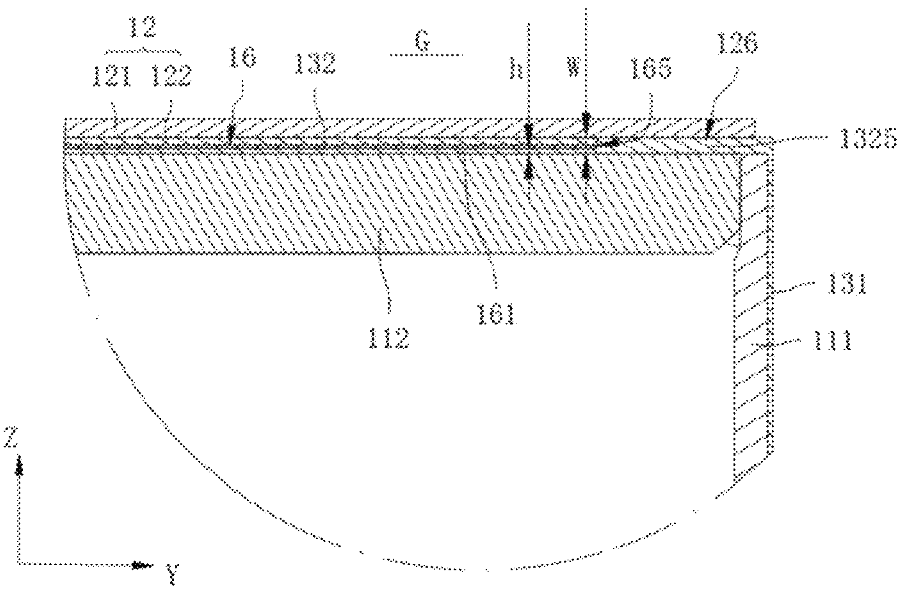
FIG. 12 shows a partial enlarged view of part G in FIG. 11.

FIG. 11 shows an F-F sectional view in FIG. 4; FIG. 12 is a partial enlarged view of part G in FIG. 11; and FIG. 13 shows a structural schematic view of the battery cell in some embodiments of the present disclosure (the end cap patch and the first glue layer are not shown).

Figure 13:
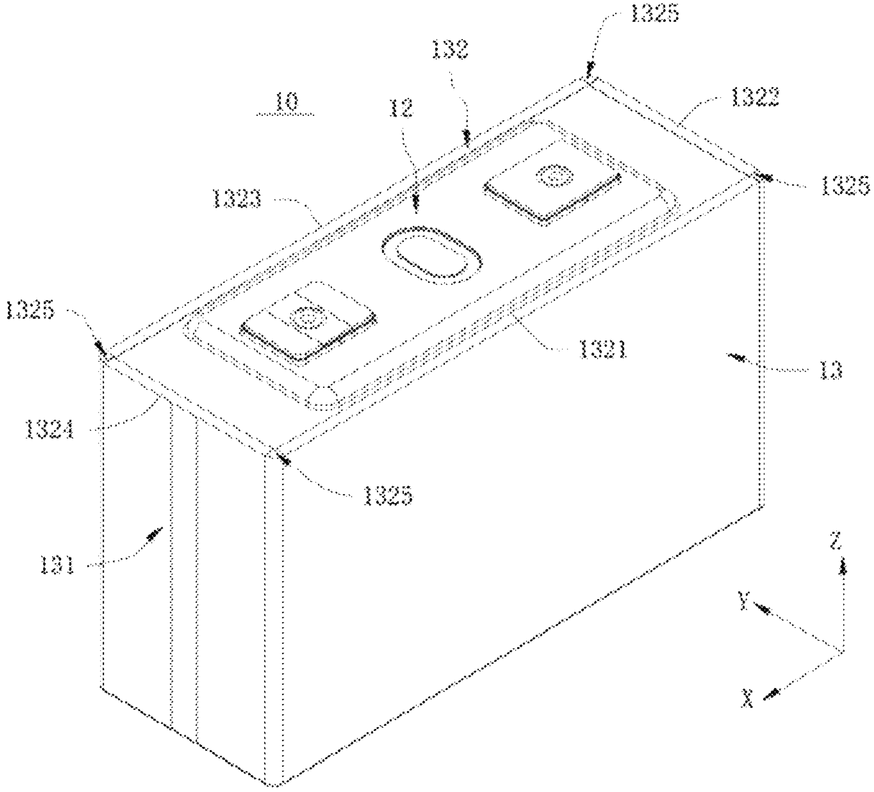
FIG. 13 shows a structural schematic view of the battery cell in some embodiments of the present disclosure (the end cap patch and a first glue layer are not shown)

As shown in FIG. 11, FIG. 12, and FIG. 13, in some embodiments of the present disclosure, the end cap 112 is rectangular, the flanging portion 132 has overlapping regions at four corners of the end cap 112, and four corners of the first glue layer 16 are each formed with a notch 165 for avoiding corresponding overlapping region.

Specifically, the notches 165 are formed in the first portion 161 of the first glue layer 16; the flanging portion 132 includes a first flange 1321, a second flange 1322, a third flange 1323, and a fourth flange 1324, the first flange 1321, the second flange 1322, the third flange 1323, and the fourth flange 1324 are corresponding to four edges of the end cap 112 respectively. The first flange 1321 and the third flange 1323 both extend along the first direction X and are provided opposite to each other along the second direction Y; and the second flange 1322 and the fourth flange 1324 both extend along the second direction Y and are provided opposite to each other along the first direction X.

It should be understood that, the thickness h of the foregoing flanging portion 132 refers to thickness of a single layer of flange, that is, the thickness of the first flange 1321, the second flange 1322, the third flange 1323, or the fourth flange 1324. A thickness W of the overlapping region 1325 is greater than h, and according to a molding manner of the insulating film 13, the thickness W of the overlapping region 1325 may be twice or three times of the thickness h of the flanging portion 132.

As shown in FIG. 12 and FIG. 13, taking a joint of the first flange 1321 and the second flange 1322 as an example, the first flange 1321 and the second flange 1322 are stacked to form one overlapping region 1325, and the thickness of the overlapping region 1325 is greater than that of the first flange 1321 or the second flange 1322. Based on the foregoing embodiment in which "one insulating film 13 is provided, and the flanging portion 132 is folded inwards along the edge of the end cap 112", the thickness W of the overlapping region 1325 is equal to a sum of the thickness of the first flange 1321 and the thickness of the second flange 1322, i.e., W=2h. Based on the foregoing embodiment in which "a plurality of insulating films 13 are provided, the flanging portions 132 of the plurality of insulating films 13 are circumferentially provided at intervals along the edge of the end cap 112, and the joint of the flanging portions 132 of two adjacent insulating films 13 is stacked", the thickness W of the overlapping region 1325 is equal to a sum of the thickness of the first flange 1321, the thickness of the second flange 1322, and a thickness of an inner folding layer, wherein the thickness of the inner folding layer is the same as the thickness of a single layer of flange, i.e., W=3h.

In the above solution, the thickness of the overlapping region of the flanging portion 132 is greater than remaining regions, the notch at each of the four corners of the first glue layer 16 can avoid corresponding overlapping region of the flanging portion 132, and the overlapping region is partially accommodated in corresponding notch, so that the stress is uniform when the end cap patch 12 is bonded to the end cap 112.

As shown in FIG. 8, FIG. 12, and FIG. 13, in some embodiments of the present disclosure, a concave portion 126 is provided on one side of the end cap patch 12 facing the end cap 112, and the concave portion 126 is provided corresponding to the overlapping region 1325.

The concave portion 126 can run through the end cap patch 12 along a thickness direction of the end cap patch 12, or may be recessed from one side of the end cap patch 12 facing the end cap 112. For example, an end corner of the second glue layer 122 corresponding to the overlapping region 1325 has an opening, the opening forms the concave portion 126, and the overlapping region 1325 fills the opening of the second glue layer 122 and abuts against a side surface of the patch body 121 facing the end cap 112. For another example, on the basis that the end corner of the second glue layer 122 has the opening, the side surface of the patch body 121 facing the end cap 112 is further recessed to form a thinned region, and the opening of the second glue layer 122 and the thinned region of the patch body 121 together form the concave portion 126. For another example, the patch body 121 is formed with an opening corresponding to the opening of the second glue layer 122, the opening of the patch body 121 runs through the patch body 121 along a thickness direction thereof, the opening of the patch body 121 and the opening of the second glue layer 122 together form the concave portion 126, and the overlapping region 1325 fills the concave portion 126 and exposes a side surface of the end cap patch 12 facing away from the end cap 112.

In the above solution, the end cap patch 12 has the concave portion 126 corresponding to the overlapping region 1325 of the flanging portion 132, which can further avoid the overlapping region of the flanging portion 132, avoid non-uniform stress of the end corner of the patch body 121 corresponding to the overlapping region 1325, also can reduce the distance between the end cap patch 12 and the end cap 112, reduce a degree to which the end cap patch 12 protrudes from the end cap 112, and thus reduce an outer dimension of the battery cell 10 provided with the end cap patch 12.

Some embodiments of the present disclosure provide a battery 100, including the battery cell 10 provided in some embodiments of the present disclosure.

Due to characteristics of the battery cell 10 in some embodiments of the present disclosure, the battery 100 in some embodiments of the present disclosure also has relatively good safety performance.

Some embodiments of the present disclosure provide a power consumption device, including the battery 100 provided in some embodiments of the present disclosure, wherein the battery 100 is configured to provide electric energy.

Due to characteristics of the battery cell 10 in some embodiments of the present disclosure, the power consumption device in some embodiments of the present disclosure also has relatively good safety performance.

Figure 14:
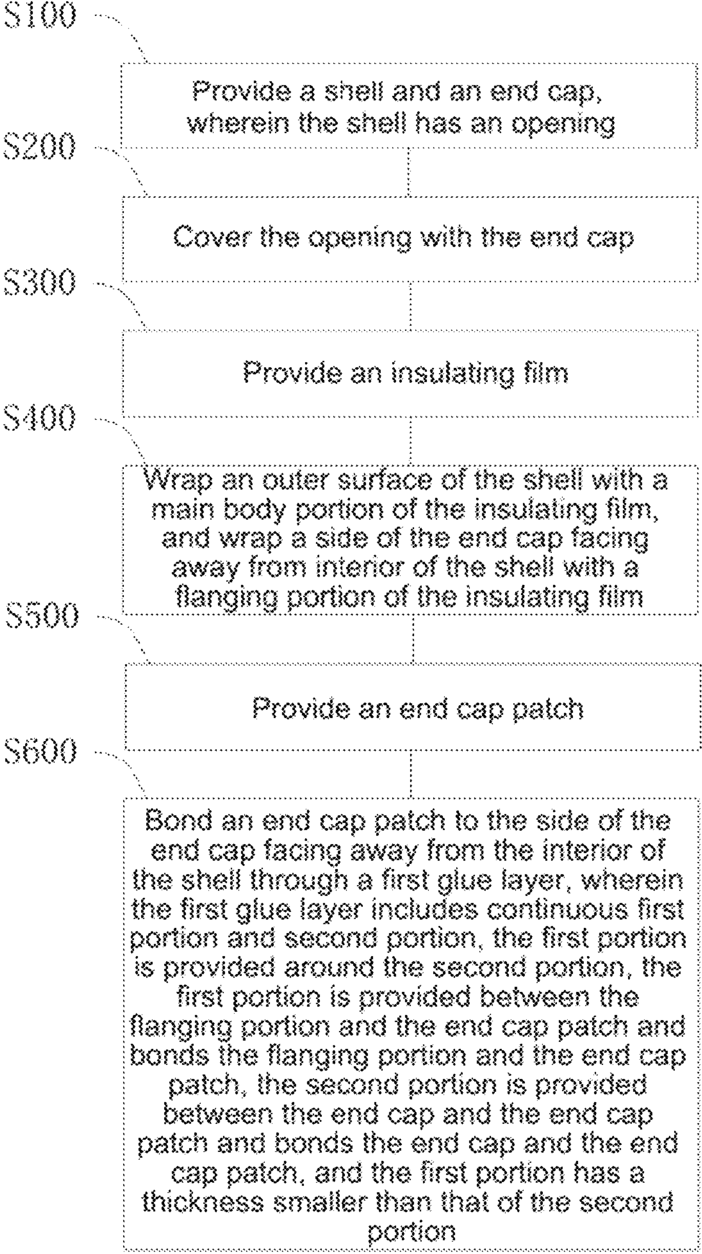
FIG. 14 shows a schematic view of a method for manufacturing a battery cell in some embodiments of the present disclosure.

FIG. 14 shows a schematic view of a method for manufacturing a battery cell in some embodiments of the present disclosure.

As shown in FIG. 14, some embodiments of the present disclosure provide a method for manufacturing a battery cell, including:

S100: providing a shell 111 and an end cap 112, wherein the shell 111 has an opening;

S200: covering the opening with the end cap 112;

S300: providing an insulating film 13;

S400: wrapping an outer surface of the shell 111 with a main body portion 131 of the insulating film 13, and wrapping a side of the end cap 112 facing away from interior of the shell 111 with a flanging portion 132 of the insulating film 13;

S500: providing an end cap patch; and

S600: bonding the end cap patch 12 to the side of the end cap 112 facing away from the interior of the shell 111 through a first glue layer 16, wherein the first glue layer 16 includes a first portion 161 and a second portion 162 which are provided continuously, the first portion 161 is provided around the second portion 162, the first portion 161 is provided between the flanging portion 132 and the end cap patch 12 and bonds the flanging portion 132 and the end cap patch 12, the second portion 162 is provided between the end cap 112 and the end cap patch 12 and bonds the end cap 112 and the end cap patch 12, and the first portion 161 has a thickness smaller than that of the second portion 162.

Figure 15:
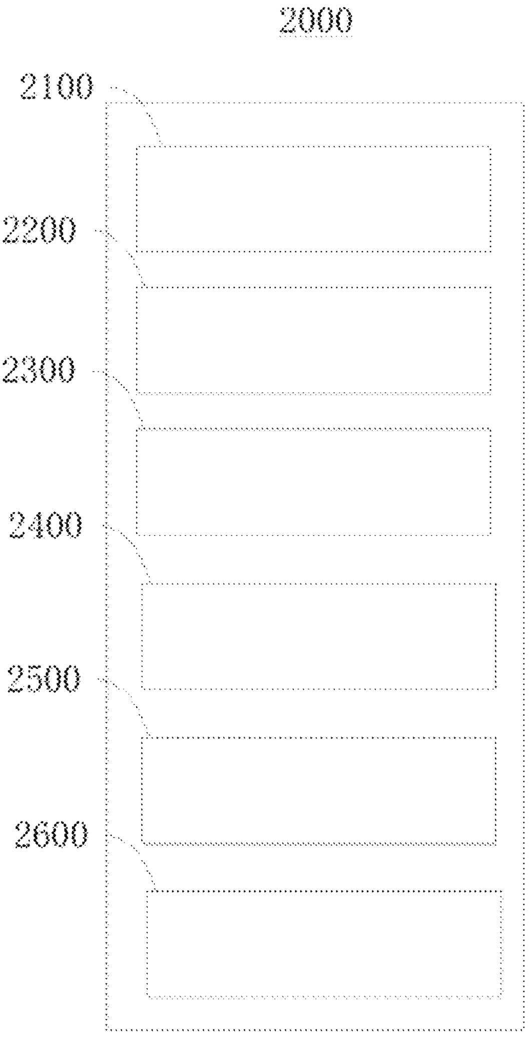
FIG. 15 shows a schematic view of a device for manufacturing a battery cell in some embodiments of the present disclosure.

FIG. 15 shows a schematic view of a device for manufacturing a battery cell in some embodiments of the present disclosure.

As shown in FIG. 15, some embodiments of the present disclosure provide a device 2000 for manufacturing a battery cell, including:

a first providing means 2100, configured to provide a shell 111 and an end cap 112, wherein the shell 111 has an opening;

a second providing means 2200, configured to provide an insulating film 13;

a third providing means 2300, configured to provide an end cap patch 12;

a first assembling module 2400, configured to cover the opening with the end cap 112;

a second assembling module 2500, configured to wrap an outer surface of the shell Ill with a main body portion 131 of the insulating film 13, and wrap a side of the end cap 112 facing away from interior of the shell 111 with a flanging portion 132 of the insulating film 13; and a third assembling module 2600, configured to bond the end cap patch 12 to the side of the end cap 112 facing away from the interior of the shell 111 through a first glue layer 16, wherein the first glue layer 16 includes a first portion 161 and a second portion 162 which are provided continuously, the first portion 161 is provided around the second portion 162, the first portion 161 is provided between the flanging portion 132 and the end cap patch 12 and bonds the flanging portion 132 and the end cap patch 12, the second portion 162 is provided between the end cap 112 and the end cap patch 12 and bonds the end cap 112 and the end cap patch 12, and the first portion 161 has a thickness smaller than that of the second portion 162.

As shown in FIG. 1 to FIG. 15, some embodiments of the present disclosure provide a battery cell 10, including a shell

111, an end cap 112, an end cap patch 12, an insulating film 13, and a first glue layer 16. The end cap patch 12 includes a patch body 121 and a second glue layer 122, the second glue layer 122 is provided on an inner side of the patch body 121, the insulating film 13 includes a main body portion 131 and a flanging portion 132, the main body portion 131 wraps an outer surface of the shell 111, the flanging portion 132 is folded to an outer surface of the end cap 112, the end cap patch 12 is bonded to the outer surface of the end cap 112 through the first glue layer 16, and the flanging portion 132 is pressed against the outer surface of the end cap 112. The first glue layer 16 includes a first portion 161, a second portion 162, and a third portion 163. The first portion 161 is provided around the second portion 162, a thickness H1 of the first portion 161 is smaller than a thickness H2 of the second portion 162, and the thickness H2 of the second portion 162 is equal to a sum of the thickness H1 of the first portion 161 and a thickness h of the flanging portion 132. One end of the third portion 163 is connected with the second portion 162, the third portion 163 is provided around a side wall 11221 of a first convex portion 1122 of the end cap 112, and bonds the end cap patch 12 and the side wall 11221; and a top wall 11222 of the first convex portion 1122 is bonded to the end cap patch 12 through the second glue layer 122.

There is an overlapping region 1325 at each of four corners of the flanging portion 132, a thickness W of the overlapping region 1325 is equal to two or three times the thickness h of a single layer of the flanging portion 132 depending on different molding processes of a particular flanging portion 132. Each end corner of the first portion 161 of the first glue layer 16 can be formed with a notch 165 corresponding to the overlapping region 1325, so that a surface of the overlapping region 1325 is attached to the end cap patch 12. For example, when W=2h, and the thickness H1 of the first portion 161 is h, the thickness H2 of the second portion 162 is H1+h=2h, at which time the overlapping region 1325 fills the notch 165 and abuts against an inner surface of the end cap patch 12.

Further, the end cap patch 12 also may be provided with a concave portion 126 corresponding to the notch 165 to further avoid stress of the end cap patch 12 at a position of the overlapping region 1325. For example, when W=3h, and the thickness H1 of the first portion 161 is h, the thickness H2 of the second portion 162 is 2h, the thickness of the second glue layer 122 is h, and an end corner of the second glue layer 122 has an opening corresponding to a shape of the overlapping region 1325, i.e., the concave portion 126 of the end cap patch 12, at this time, the overlapping region 1325 further fills the concave portion 126 on the basis of filling the notch 165, and a surface of the overlapping region 1325 abuts against an inner surface of the patch body 121.

In the battery cell 10 of some embodiments of the present disclosure, since the thickness H1 of the first portion 161 of the first glue layer 16 is smaller than the thickness H2 of the second portion 162, the notch 165 corresponding to the overlapping region 1325 is formed at an end corner of the first glue layer 16, and the concave portion 126 corresponding to the overlapping region 1325 is provided at the end corner of the second glue layer 122, a gap between the patch body 121 and the end cap 112 can be filled according to a surface shape of the flanging portion 132, it is realized that there is no phenomenon of stress concentration after the patch body 121 is bonded to the end cap 112 through the first glue layer 16 and the second glue layer 122, and the edge of the patch body 121 will not warp after long-term use. Therefore, the flanging portion 132 can be reliably pressed against the outer surface of the end cap 112, which ensures that the creepage distance of the battery cell 10 will not become smaller after long-term use, so as to ensure that a plurality of battery cells 10 have better insulation performance and safety performance when being connected in series and adjacent to each other.

It should be noted that the features in the embodiments of the present disclosure may be combined with each other without conflict.

The above-mentioned are merely for preferred embodiments of the present disclosure and not used to limit the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

What is claimed is:

1. A battery cell, comprising:
a shell, having an opening;
an end cap, covering the opening;
an end cap patch, provided on a side of the end cap facing away from interior of the shell;
an insulating film, comprising a main body portion and a flanging portion, wherein the main body portion is wrapped on an outer surface of the shell, and the flanging portion is provided between the end cap and the end cap patch; and
a first glue layer, comprising a first portion and a second portion which are provided continuously, wherein the first portion is provided around the second portion, the first portion is provided between the flanging portion and the end cap patch, the first portion is configured to bond the flanging portion and the end cap patch, the second portion is provided between the end cap and the end cap patch, and the second portion is configured to bond the end cap and the end cap patch,
wherein the first portion has a thickness smaller than that of the second portion.

2. The battery cell according to claim 1, wherein the first portion has a first surface facing the end cap patch, the second portion has a second surface facing the end cap patch, and the first surface is flush with the second surface.

3. The battery cell according to claim 1, wherein a sum of the thickness of the first portion and a thickness of the flanging portion is equal to the thickness of the second portion.

4. The battery cell according to claim 1, wherein the end cap comprises an end cap body and a first convex portion, the end cap body is provided around the first convex portion, the first convex portion protrudes from the end cap body towards a direction facing away from the interior of the shell, and the flanging portion, the first portion, and the second portion are all provided between the end cap body and the end cap patch.

5. The battery cell according to claim 4, wherein the first glue layer further comprises a third portion that is provided continuously with the second portion, and the third portion is provided between the first convex portion and the end cap patch.

6. The battery cell according to claim 5, wherein the first convex portion comprises a top wall and a side wall, the side wall surrounds the top wall, the side wall connects the top wall and the end cap body, and the third portion is provided between the side wall and the end cap patch.

7. The battery cell according to claim 4, wherein the first convex portion comprises a top wall and a side wall, the side wall surrounds the top wall, and the side wall connects the top wall and the end cap body; and the end cap patch comprises a patch body and a second glue layer, the second glue layer is located on a side of the patch body facing the end cap, and the second glue layer is configured to bond the top wall and the patch body.

8. The battery cell according to claim 7, wherein the second glue layer covers the side of the patch body facing the end cap, and the second glue layer is at least partially located between the first glue layer and the patch body.

9. The battery cell according to claim 8, wherein the second glue layer comprises a fourth portion and a fifth portion, the fourth portion is provided around the fifth portion, the fourth portion is located between the first glue layer and the patch body, and the fifth portion is located between the top wall and the patch body.

10. The battery cell according to claim 1, wherein the first glue layer is a thermally conductive glue, the end cap patch is formed thereon with a through hole, the first glue layer further comprises a second convex portion, the second convex portion protrudes towards a direction facing away from the end cap, and the second convex portion fills the through hole.

11. The battery cell according to claim 1, wherein the end cap is rectangular, the flanging portion has overlapping regions at four corners of the end cap, and four corners of the first glue layer are each formed with a notch for avoiding the overlapping region.

12. The battery cell according to claim 11, wherein a concave portion is provided on a side of the end cap patch facing the end cap, and the concave portion is provided corresponding to the overlapping region.

13. A battery, comprising the battery cell according to claim 1.

14. A power consumption device, comprising the battery according to claim 13, wherein the battery is configured to provide power for the power consumption device.

15. A method for manufacturing a battery cell, comprising:

providing a shell and an end cap, wherein the shell has an opening;

covering the opening with the end cap;

providing an insulating film;

wrapping an outer surface of the shell with a main body portion of the insulating film, and wrapping a side of the end cap facing away from interior of the shell with a flanging portion of the insulating film;

providing an end cap patch;

bonding the end cap patch to the side of the end cap facing away from the interior of the shell through a first glue layer, wherein the first glue layer comprises a first portion and a second portion which are provided continuously, the first portion is provided around the second portion, the first portion is provided between the flanging portion and the end cap patch and bonds the flanging portion and the end cap patch, the second portion is provided between the end cap and the end cap patch and bonds the end cap and the end cap patch, and the first portion has a thickness smaller than that of the second portion.

* * * * *